(12) United States Patent
Yang et al.

(10) Patent No.: US 8,416,856 B2
(45) Date of Patent: *Apr. 9, 2013

(54) CIRCUIT FOR COMPUTING SUMS OF ABSOLUTE DIFFERENCE

(75) Inventors: Hsing-Chien Yang, Taichung (TW); Jin-Ming Chen, Dadu Township, Taichung County (TW); Lucian-Yuan, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 1730 days.

This patent is subject to a terminal disclaimer.

(21) Appl. No.: 11/158,410

(22) Filed: Jun. 21, 2005

(65) Prior Publication Data

US 2006/0023959 A1 Feb. 2, 2006

(30) Foreign Application Priority Data

Jul. 28, 2004 (TW) .............................. 93122494 A

(51) Int. Cl.
- H04N 7/48 (2006.01)
- H04N 7/32 (2006.01)
- H04N 7/42 (2006.01)
- H04N 7/50 (2006.01)
- H04N 7/34 (2006.01)
- H04N 7/36 (2006.01)
- H04N 7/38 (2006.01)

(52) U.S. Cl. .................................. 375/240.24; 375/240

(58) Field of Classification Search ............. 375/240.01, 375/240.12

See application file for complete search history.

(56) References Cited

U.S. PATENT DOCUMENTS

| | | | | |
|---|---|---|---|---|
| 4,897,720 | A | | 1/1990 | Wu et al. ........................ 358/136 |
| 5,005,078 | A | * | 4/1991 | Gillard .......................... 348/452 |
| 5,235,537 | A | * | 8/1993 | McWhirter et al. ........... 708/200 |
| 5,717,615 | A | | 2/1998 | Pirson et al. .............. 364/715.01 |
| 5,719,642 | A | | 2/1998 | Lee .............................. 348/699 |
| 5,737,020 | A | * | 4/1998 | Hall et al. ................... 375/240.2 |
| 5,793,655 | A | | 8/1998 | Harlap et al. ........... 364/715.012 |
| 5,949,486 | A | * | 9/1999 | Ishihara et al. ............. 348/402.1 |
| 6,055,270 | A | * | 4/2000 | Ozkan et al. ............. 375/240.03 |
| 6,055,272 | A | * | 4/2000 | Kim ........................ 375/240.23 |
| 6,122,317 | A | * | 9/2000 | Hanami et al. ........... 375/240.16 |
| 6,175,593 | B1 | * | 1/2001 | Kim et al. ................. 375/240.17 |
| 6,373,893 | B1 | * | 4/2002 | Midorikawa ............. 375/240.16 |

(Continued)

OTHER PUBLICATIONS

SGS-Thomson Microelectronics, _4 Bit PIPO Shift Register_(Oct. 1992).*

(Continued)

*Primary Examiner* — David Czekaj
*Assistant Examiner* — David N Werner
(74) *Attorney, Agent, or Firm* — J.C. Patents

(57) ABSTRACT

A circuit for computing sums of absolute difference (SAD) is provided. The circuit has an absolute difference circuit, a first adder, a first register and a first selective circuit. The absolute difference circuit receives a first data $PM_{i,j}$ and a second data $PS_{i,j}$ and output a absolute difference data $AD_{i,j}$, wherein $AD_{i,j}=|PM_{i,j}-PS_{i,j}|$. The first adder receives and adds the absolute difference data and a first accumulative data, and outputs a first sum. The register receives and locks the first sum according to a first preset timing sequence, and outputs a first sum of absolute difference data. The first selective circuit receives and selects the first sum of absolute difference data or 0, and outputs the selected data as the first accumulative data.

6 Claims, 5 Drawing Sheets

U.S. PATENT DOCUMENTS

| | | | |
|---|---|---|---|
| 6,380,987 B1* | 4/2002 | Kametani | 348/699 |
| 6,414,997 B1* | 7/2002 | Piccinelli et al. | 375/240.17 |
| 6,516,031 B1* | 2/2003 | Ishihara et al. | 375/240.16 |
| 6,567,469 B1* | 5/2003 | Rackett | 375/240.16 |
| 6,584,155 B2* | 6/2003 | Takeda et al. | 375/240.16 |
| 6,650,688 B1* | 11/2003 | Acharya et al. | 375/141 |
| 6,765,965 B1* | 7/2004 | Hanami et al. | 375/240.16 |
| 7,126,991 B1* | 10/2006 | Mimar | 375/240.16 |
| 7,170,934 B2* | 1/2007 | Linzer | 375/240 |
| 7,236,523 B2* | 6/2007 | Guevorkian et al. | 375/240.12 |
| 7,245,651 B1* | 7/2007 | Miao et al. | 375/147 |
| 7,782,957 B2* | 8/2010 | Yang | 375/240.24 |
| 8,094,723 B2* | 1/2012 | Lippincott et al. | 375/240.16 |
| 2001/0028681 A1 | 10/2001 | Chol | 375/240.12 |
| 2002/0009144 A1* | 1/2002 | Ishihara et al. | 375/240.16 |
| 2002/0039386 A1 | 4/2002 | Han et al. | 375/240.16 |
| 2003/0016748 A1* | 1/2003 | Hwang et al. | 375/240.12 |
| 2003/0095603 A1* | 5/2003 | Lan et al. | 375/240.17 |
| 2003/0198295 A1* | 10/2003 | Chen et al. | 375/240.16 |
| 2004/0172433 A1* | 9/2004 | Acharya et al. | 708/300 |
| 2005/0013366 A1* | 1/2005 | Gallant et al. | 375/240.16 |
| 2005/0105615 A1* | 5/2005 | El-Maleh et al. | 375/240.16 |
| 2005/0190844 A1* | 9/2005 | Kadono et al. | 375/240.16 |
| 2005/0207494 A1* | 9/2005 | Ahn et al. | 375/240.16 |
| 2005/0238098 A1* | 10/2005 | Fandrianto et al. | 375/240.12 |
| 2005/0249284 A1* | 11/2005 | Lee et al. | 375/240.16 |
| 2005/0276329 A1* | 12/2005 | Adiletta et al. | 375/240.16 |
| 2005/0286641 A1* | 12/2005 | Cao | 375/240.26 |
| 2006/0098740 A1* | 5/2006 | Byun et al. | 375/240.16 |
| 2006/0120455 A1* | 6/2006 | Park et al. | 375/240.16 |
| 2006/0198445 A1* | 9/2006 | Li et al. | 375/240.17 |
| 2006/0203908 A1* | 9/2006 | Chuang | 375/240.12 |
| 2006/0285597 A1* | 12/2006 | Gupta et al. | 375/240.17 |
| 2007/0071101 A1* | 3/2007 | Topham | 375/240.16 |
| 2007/0071107 A1* | 3/2007 | Ha | 375/240.24 |
| 2007/0110164 A1* | 5/2007 | Yang | 375/240.24 |
| 2007/0121728 A1* | 5/2007 | Wang et al. | 375/240.18 |
| 2007/0127577 A1* | 6/2007 | Tourapis et al. | 375/240.16 |
| 2007/0217515 A1* | 9/2007 | Wang et al. | 375/240.17 |
| 2008/0298692 A1* | 12/2008 | Guo et al. | 382/232 |
| 2009/0257493 A1* | 10/2009 | Ye et al. | 375/240.12 |
| 2010/0074336 A1* | 3/2010 | Goor et al. | 375/240.16 |

OTHER PUBLICATIONS

Paul Scherz, _Practical Electronics for Inventors_ 2d Ed. 721-22 (2007).*

"A Family of VLSI Designs for the Motion Compensation Block-Matching Algorithm" Kun-Min Yang et al, IEEE Transactions on Circuits and Systems, vol. 36, No. 10, Oct. 1989, pp. 1317-1325.

International Organisation for Standardisation Organisation Internationale De Normalisation ISO/IEC JTC 1/SC 29/WG 11 Coding of Moving Pictures and Audio, ISO/IEC JTC 1/SC 29/WG 11 N5555, Pattaya, Mar. 2003 Title: Draft Text of Final Draft International Standard for Advanced Video Coding, Draft ISO/IEC 14496-10: 2002 (E).

* cited by examiner

CIRCUIT FOR COMPUTING SUMS OF ABSOLUTE DIFFERENCE

CROSS-REFERENCE TO RELATED APPLICATION

This application claims the priority benefit of Taiwan application serial no. 93122494, filed on Jul. 28, 2004. All disclosure of the Taiwan application is incorporated herein by reference.

BACKGROUND OF THE INVENTION

1. Field of the Invention

The present invention relates to a motion estimation circuit, and more particularly to a circuit for computing sums of absolute difference (SAD).

2. Description of Related Art

Generally, digital visual communication carries tremendous large amount of data. In order to save into the storage space, visual communication data and the bandwidth thereof, the visual communication data should be compressed. Data compression achieves the purpose of reducing the amount of data by removing redundant data inform the visual communication data. For example, if the last frame is similar to the next frame, the parts of the next frame similar to those of the last frame are removed and the dissimilar parts of the next frame are preserved. Accordingly, the amount of the visual communication data can be substantially reduced. For example, MPEG visual data compression standard has been widely used as a visual coding method.

When the present frame and the to-be-compared frame are compared, presently, the frame is divided into a plurality of image blocks. The typical size of image blocks is 16×16 or 8×8 pixels. One of the image blocks is selected and compared with the to-be-compared frame by a searching process. In the to-be-compared frame, the block corresponding to the present image block serves as a center, and a search region composed of pixels covering a specific distance from the center is called search window. The specific distance is called a search range. In the search window, the image block is compared to each of the to-be-compared image blocks so as to determine the block that is most similar to the image block. This process is called motion estimation.

During the comparison of the present image block and the to-be-compared image blocks, the computation of SAD for these two pixels is performed. In other words, the pixel data of the image block and the to-be-compared blocks are subtracted from each other. Then the absolute values of the computed results are obtained. The accumulation of the absolute values is the SAD of the image block and the to-be-compared block. The similarity of the image block and the to-be-compared block can be determined according to SAD.

In the prior art process, after the completion of the SAD computation, the circuit has to be reset before the next SAD computation is performed. For motion estimation requiring a large number of SAD computations, the reset step consumes significant amount of the operating time.

Presently, the prior art method cannot meet the H.264 standard with 8×16, 16×8, 8×4, 4×8 and 4×4 image block data. Moreover, the prior art method can only compute for the 16×16 or 8×8 image block data, and cannot support the tree-structure motion estimation.

SUMMARY OF THE INVENTION

Accordingly, the present invention is directed to providing a circuit for computing SAD. By inputting the image block data and the to-be-compared block data once, SAD for 16×16, 16×8, 8×16, 8×8, 8×4, 4×8 and 4×4 image blocks can be computed with a parallel or sequential manner. According to an embodiment of the present invention, the circuit is capable of performing the next SAD computation without resetting the circuit. Accordingly, the operating efficiency of the circuit can be effectively improved.

According to an embodiment of the present invention, a circuit for computing the SAD comprises an absolute difference circuit, a first adder, a first register without reset function and a first selective circuit. The absolute difference circuit receives a first data $PM_{i,j}$ and a second data $PS_{i,j}$, and outputs an absolute difference data $AD_{i,j}$. $PM_{i,j}$, $PS_{i,j}$ and $AD_{i,j}$ represent a (i,j) data of the first data, the second data and the absolute difference data, respectively, wherein $AD_{i,j}=|PM_{i,j}-PS_{i,j}|$, and i and j are integers not less than 0. The first adder receives and adds the absolute difference data and a first accumulative data, and outputs a first sum. The register receives and locks the first sum according to a first preset timing sequence, and outputs a first SAD data which is an accumulation of a 4×4 array from $AD_{i,j}$ to $AD_{i+3,j+3}$. The first selective circuit receives and selects the first SAD data or 0, and outputs the selected data as the first accumulative data.

According to an embodiment of the present invention, the circuit further comprises at least one set of accumulative circuits for receiving and accumulating the first SAD, so as to output a second SAD and accumulate the second SAD according to the preset timing sequence. According to an embodiment of the present invention, the first SAD is an accumulation of a 4×4 array as $$\sum_{i=4k}^{4k+3}\sum_{j=4k}^{4k+3} AD_{i,j}, \quad k=\{k \mid k=0,1,2,3\}.$$

The second SAD is $$\sum_{i=0}^{7}\sum_{j=0}^{3} AD_{x+i,y+j}$$

where x∈{0,8}y ∈{0,4,8,12}, $$\sum_{i=0}^{3}\sum_{j=0}^{7} AD_{x+i,y+j}$$

where x∈{0,4,8,12}y∈{0,8}, $$\sum_{i=0}^{7}\sum_{j=0}^{7} AD_{x+i,y+j}$$

where $x \in \{0,8\} y \in \{0,8\}$, $$\sum_{i=0}^{15}\sum_{j=0}^{7} AD_{x+i,y+j}$$

where $x \in \{0\} y \in \{0,8\}$, $$\sum_{i=0}^{7}\sum_{j=0}^{15} AD_{x+i,y+j}$$

where $x \in \{0,8\} y \in \{0\}$, or $$\sum_{i=0}^{15}\sum_{j=0}^{15} AD_{x+i,y+j}$$

where $x \in \{0\} y \in \{0\}$.

According to an embodiment of the present invention, the accumulative circuit comprises a third adder, a third register and a third selective circuit. The third adder receives and accumulates the first sum of absolute difference data and a third accumulative data, and outputs a third accumulative value. The third register receives and locks the third accumulated value according to a third preset time sequence, outputting the second SAD. The third selective circuit receives and selects the second SAD, absolute difference or the zero data. The third accumulated value is output from the third register.

According to an embodiment of the present invention, the circuit further comprises a fourth register and a fourth selective circuit. The fourth register receives and locks the first accumulated value according to a fourth preset timing sequence, and outputs a third SAD. The fourth selective circuit is coupled between the absolute difference circuit and the first adder. The fourth selective circuit is also coupled to the fourth register for receiving and selecting the absolute difference data, the third SAD and the zero data so as to output the selected data to the first adder for adding operation with the first SAD.

According to an embodiment of the present invention, the circuit further comprises a second adder, a fifth register and a fifth selective circuit. The second adder receives and accumulates the third SAD and a fifth accumulative data so as to output a fifth accumulated value. Along the fifth preset time sequence, the fifth register receives and locks the fifth accumulated value, so as to output the fourth SAD. The fifth selective circuit receives and selects the fourth SAD or the zero data so as to output the selected data as the fifth accumulative data.

According to an embodiment of the present invention, the circuit, in sequence or in parallel, compute the SAD for 16×16, 16×8, 8×16, 8×8, 8×4, 4×8 and 4×4 image blocks by inputting the image block data and the to-be-compared block data, only once. The circuit, according to the present embodiment of the present invention, may also support the processing element for tree-structure motion estimation. The circuit, according to the present embodiment of the present invention, can perform next SAD computation without resetting the absolute difference circuit. Accordingly, the operating efficiency of the circuit can be effectively improved.

The above and other features of the present invention will be better understood from the following detailed description of the preferred embodiments of the invention that is provided in communication with the accompanying drawings.

DESCRIPTION OF EMBODIMENTS

Figure 1:
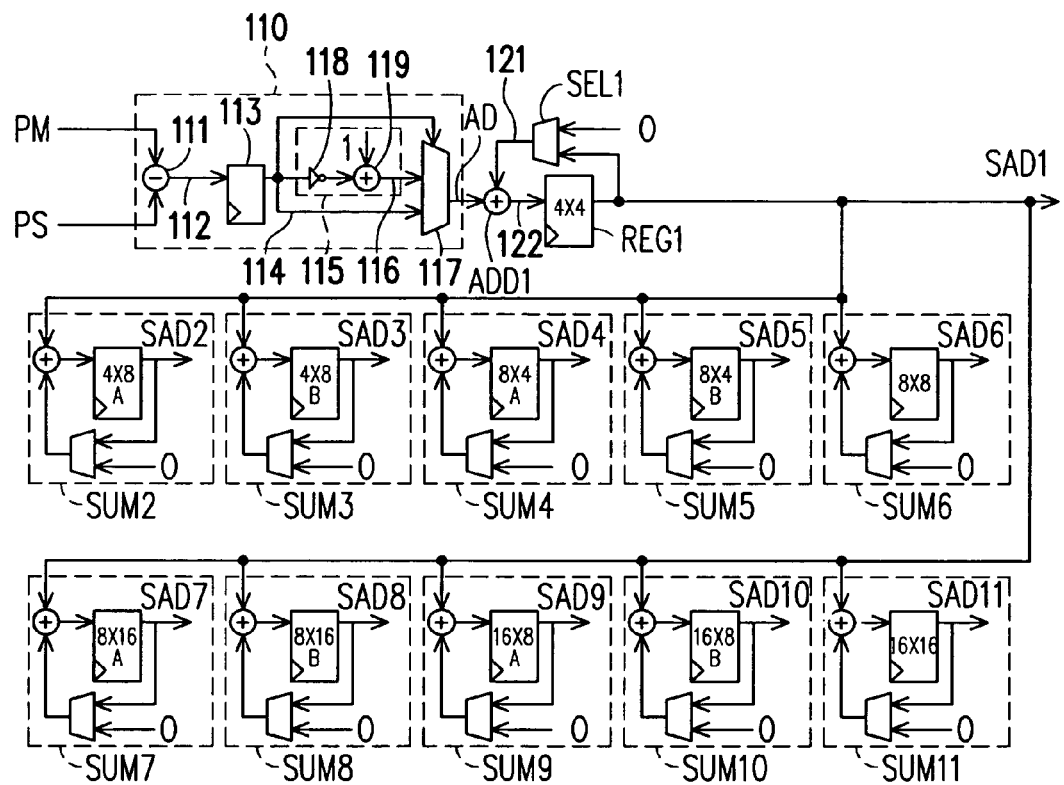
FIG. 1 is a schematic circuit block diagram showing a circuit for computing SAD in accordance with a preferred embodiment of the invention.

FIG. 1 is a circuit block diagram showing a circuit for computing SAD according to an embodiment of the present invention. Referring to FIG. 1, a first data PM, e.g. an image block data, and a second data PS, e.g. a to-be-compared image block diagram comprise series of data. The absolute difference circuit 110 receives the image block data PM and the to-be-compared image block data PS, and outputs an absolute difference data AD, wherein AD=|PM−PS|.

Following are the descriptions of the absolute difference circuit 110. The subtracter 111 receives the image block data PM as well as the to-be-compared image block data PS, and then subtracts the image block data PM from the to-be-compared image block data PS or subtracts the to-be-compared image block data PS from the image block data PM so as to output the difference value 112. The register 113 is coupled to the subtracter 111, locking the difference value 112 according to the preset timing sequence so as to output the difference value 114. The complement circuit 115 is coupled to the register 113 for generating the complement value 116 according to the difference value 114. The selective circuit 117 is coupled to the register 113 and the complement circuit 115 for receiving the difference value 114 and the complement value 116 of the difference value 114, and outputting the difference value 114 or the complement value 116 of the difference value 114 which is a positive value as the absolute difference data AD.

The complement circuit 115 comprises, for example, an inverter 118 and an adder 119. The inverter 118 receives and inverses the difference value 114. The adder 119 is coupled to the inverter 118 for receiving and adding the inversed difference value 114, arid outputting the complement value 116 of the difference value 114.

The adder ADD1 receives and adds the absolute difference data AD and the accumulative data 121, and outputs the accumulated result as the sum 122. The register REG1 locks the sum 122 according to the preset timing sequence, and outputs the SAD data SAD1. The selective circuit SEL1 receives and selects the SAD1 or 0, and outputs the selected data as the accumulative data 121.

Figure 2A:
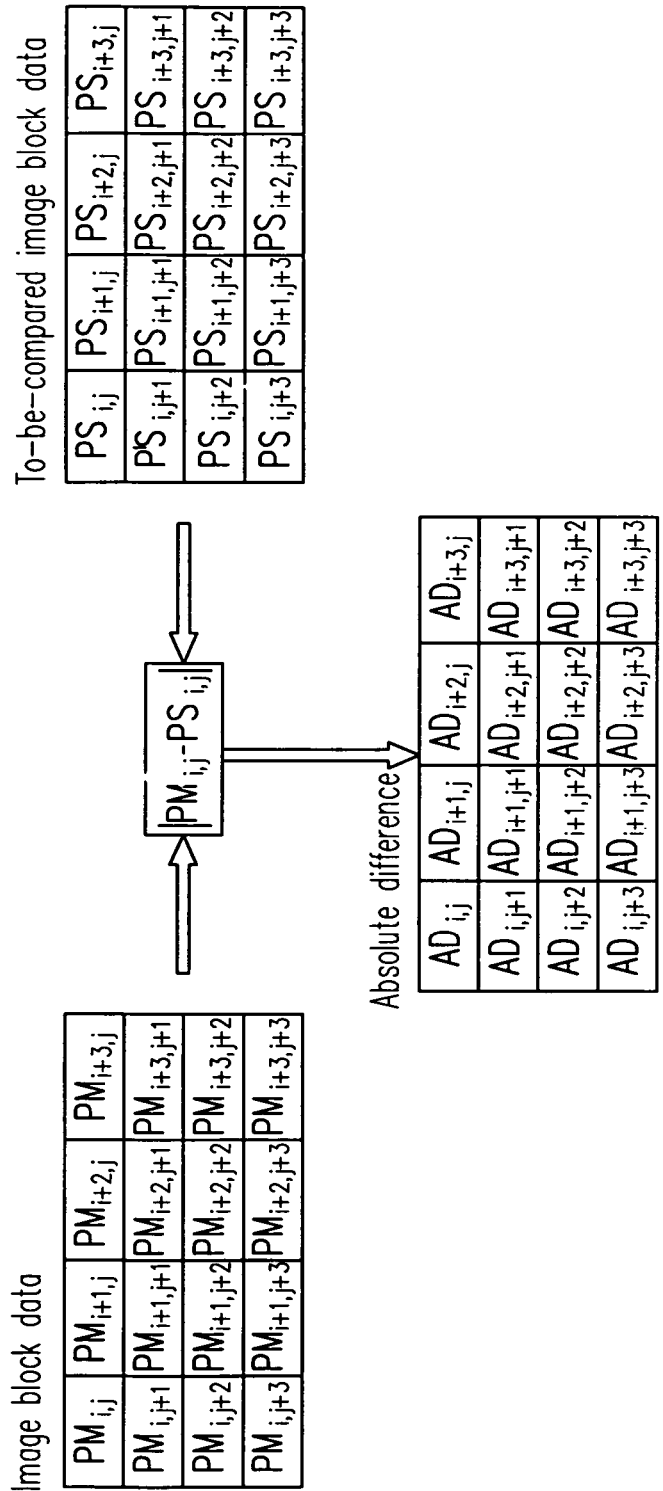
FIG. 2A is a view showing computation of absolute difference of an image block data and a to-be-compared image block data according to an embodiment of the present invention.

In this embodiment, the register REG1 stores the SAD of the 4×4 pixel. The computation of absolute difference of the image block data and the to-be-compared image block data according to an embodiment of the present invention is shown in FIG. 2A. Referring to FIG. 1 and FIG. 2A, the absolute difference circuit 110 receives the image block data PM and the to-be-compared image block data PS. The absolute difference circuit 110 receives the image block data PM and the to-be-compared image block data PS, and then generates the absolute difference data $AD_{i,j}$~$AD_{i+3,j+3}$ according to the formula: $AD_{i,j}=|PM_{i,j}-PS_{i,j}|$.

When the first absolute difference data $AD_{i,j}$ of each one 4×4 is computed, the circuit SEL1 select 0 as the output. Thus, the register REG1 locks the computed result $AD_{i,j}+0$ of the adder ADD1 as the output SAD1. After the absolute difference circuit 110 generates the second absolute difference data $AD_{i+1,j}$, the selective circuit SEL1 selects and transmits the SAD1, i.e. $AD_{i,j}$, outputted from the register REG1 to the adder ADD1. The register REG1 locks the computed result $AD_{i,j}+AD_{i+1,j}$ outputted from the adder ADD1. Accordingly, after the absolute difference circuit 110 generates the last absolute difference data $AD_{i+3,j+3}$ of the 4×4 pixel, the selective circuit SEL1 selects and transmits the SAD1, i.e. $AD_{i,j}+ \ldots +AD_{i+2,j+3}$, outputted from the register REG1 to the adder ADD1. The register REG1 locks the computed result $$\sum_{i=0}^{3}\sum_{j=0}^{3} AD_{i,j}$$

outputted from the adder ADD1. The computation of SAD for the 4×4 pixel is completed.

According to an embodiment of the present invention, the circuit can also be adapted for computing SAD a variety of image block data, and is not limited to 4×4 pixel described above. In the present embodiment, the output terminal of the register REG1 is coupled to a plurality of sets of accumulative circuits SUM2-SUM11. The accumulative circuits compute the SAD by accumulating SAD1. For example, the accumulative circuits SUM2-SUM11 accumulate the SAD2-SAD11 of the 4×8(left), 4×8(right), 8×4(top), 8×4(bottom), 8×8, 8×16(left), 8×16(right), 16×8 (top), 16×8(bottom) and 16×16 image block data according to the preset timing sequence.

One of ordinary skill in the art will understand that the number of the accumulative circuits is not fixed. For example, if the SAD for the 4×4, 8×8 and 16×16 image block data are to be simultaneously computed, the accumulative circuits SUM2-SUM5 and SUM7-SUM10 shown in FIG. 1 maybe are not required. If the SAD of the 8×8 image block data is to be computed only, the accumulative circuits SUM2-SUM11 shown in FIG. 1 maybe are not required. By modifying the timing sequence of the selective circuit SEL1 for selecting 0, the register REG1 can output the SAD of the 8×8 image block data. These amendments described above fall within the scope of the present invention.

Figure 2B:
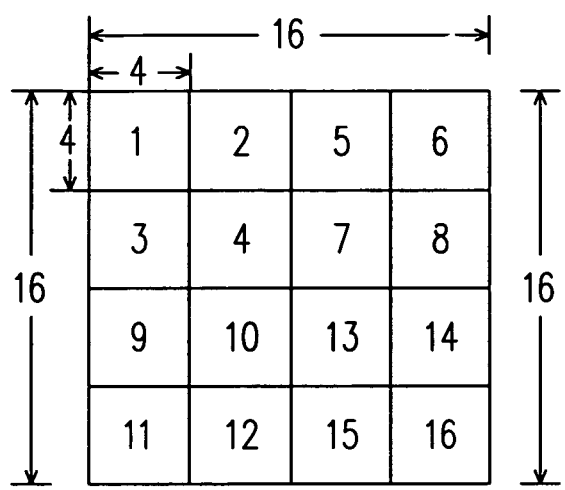
FIG. 2B illustrates an order of processing 4×4 pixel blocks. We can obtain all SAD values with inputting $PM_{i,j}$ and $PS_{i,j}$ once in the order.

FIG. 2B is a schematic view showing a 16×16 image block is split into sixteen 4×4 image blocks, and the number of each 4×4 image block is the processing order. In this embodiment, the accumulative circuits SUM2-SUM11 are circuits similar to each other. Following is the description of the accumulative circuit SUM11. The accumulative circuit SUM11 comprises an adder, a register and a selective circuit. The operations of the adder, the register and the selective circuit are similar to those of the adder ADD1, the register REG1 and the selective circuit SEL1, respectively. Therefore, detailed descriptions thereof are not repeated. The SUM11 compute the SAD of 16×16 image block by accumulating sixteen SAD of 4×4 image block, i.e. SAD1.

In the embodiment described above, the circuit of the present invention computes SAD for various image block data in a short time. Following is a description concerning the circuit area.

Figure 3:
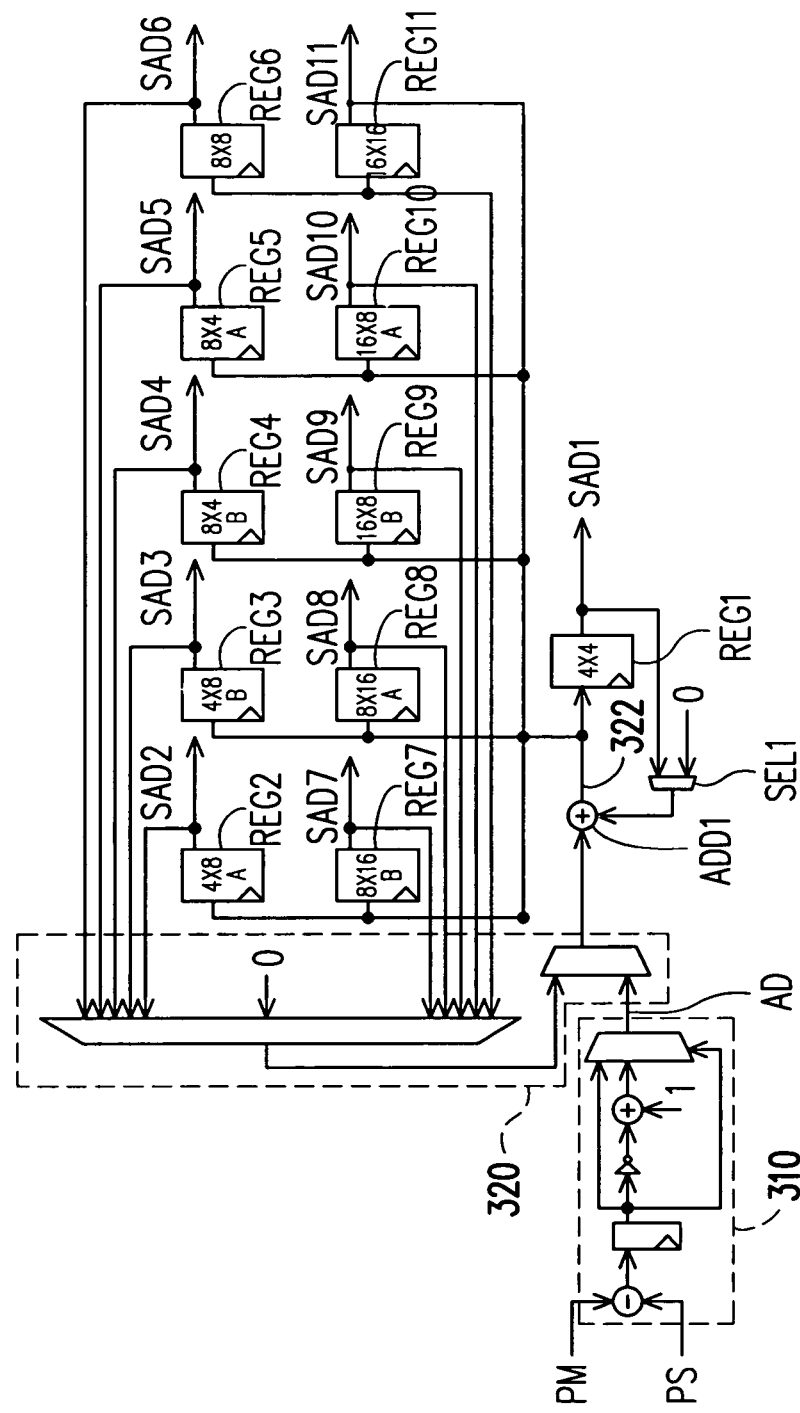
FIG. 3 is a schematic circuit block diagram showing a circuit for computing SAD according to another preferred embodiment of the invention.

FIG. 3 is a schematic circuit block diagram showing a circuit for computing SAD according to another embodiment of the present invention. Referring to FIG. 3, the absolute circuit 310 receives the image block data PM and the to-be-compared image block data PS, and outputs the absolute difference data AD. The absolute difference circuit 310, the adder ADD1, the register REG1 and the selective circuit SEL1 are similar to the absolute difference circuit 110, the adder ADD1, the register REG1 and the selective circuit SEL1 shown in FIG. 1, respectively. Therefore, detailed descriptions thereof are not repeated.

Referring to FIG. 3, the selective circuit 320 is coupled between the absolute circuit 310 and the adder ADD1. In this embodiment, it is assumed that the register REG1 stores the SAD of the 4×4 pixel. The outputs, SAD2 to SAD11, are accumulated. According to an embodiment of the present invention, the circuit can also be adapted for computing SAD of a variety of image block data, and is not only limited to the 4×4 pixel described above.

One of ordinary skill in the art will understand that the number of the accumulative circuits is not fixed. For example, if the SAD for the 4×4, 8×8 and 16×16 image block data are to be simultaneously computed, the accumulative circuits SUM2-SUM5 and SUM7-SUM10 shown in FIG. 1 maybe are not required. If the sum of absolute difference of the 8×8 image block data is to be computed, the accumulative circuits SUM2-SUM11 shown in FIG. 1 maybe not required. By modifying the timing sequence of the selective circuit SEL1 for selecting 0, the register REG1 can output the sum of absolute difference for the 8×8 image block data. These embodiments described above fall within the scope of the present invention.

In this embodiment, the sequence of the data for the 4×4 pixel is shown in FIG. 2B. Referring to FIG. 2B and FIG. 3, after the adder ADD1 completes the SAD. computation for the first 4×4 image block data in which the accumulative value 322 is the sum of absolute difference data of the 4×4 image block data, the registers REG2, REG4, REG6, REG7, REG9, REG11 and REG1 lock the accumulative value 322. After the adder ADD1 completes the SAD computation for the second 4×4 image block data, REG3 and REG1 lock the accumulative value 322. The selective circuit 320 selects and outputs SAD4, SAD6, SAD7, SAD9 and SAD11 to the adder ADD1 for the adding computations with SAD1 of the second 4×4 image block data so as to store the accumulative results. The register REG4 outputs SAD4 of the first 8×4 image block data. The other data are outputted according thereto therefore, detailed descriptions thereof are not repeated.

The circuits for sum of absolute difference shown in FIGS. 1 and 3 are novel and have unique features; in that, the circuit shown in FIG. 1 is capable of computing sums of absolute difference of a variety of image block data in a short time and the circuit shown in FIG. 3 has a small circuit area. Following is a description of a circuit having complement features of the circuits shown in FIGS. 1 and 3.

Figure 4:
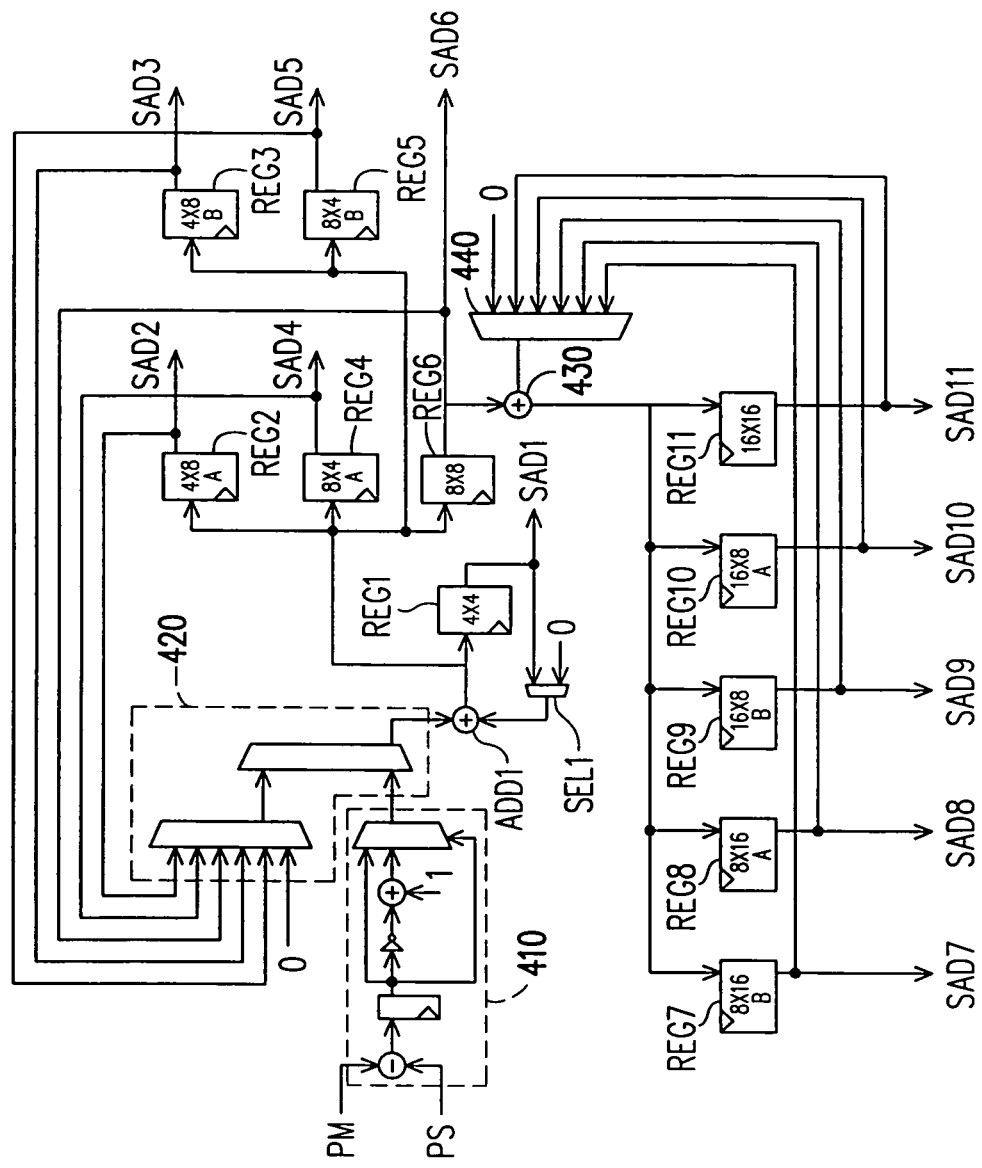
FIG. 4 is a schematic circuit block diagram showing a circuit for computing SAD according to third preferred embodiment of the invention.

FIG. 4 is a schematic circuit block diagram showing a circuit for computing sums of absolute difference according to another embodiment of the present invention. Referring to FIG. 4, the absolute circuit 410 receives the image block data PM and the to-be-compared image block data PS, and outputs the absolute difference data AD. The absolute difference circuit 410, the adder ADD1, the registers REG1 to REG6 and the selective circuit SEL1 are similar to the absolute difference circuit 310, the adder ADD1, the registers REG1 to REG6 and the selective circuit SEL1 shown in FIG. 3, respectively. Therefore, detailed descriptions thereof are not repeated.

Referring to FIG. 4, the adder 430 is coupled to the output terminal of the register REG6, and receives SAD6 so as to perform adding computation with the selected data from the selective circuit 440. When the SAD computation of the 8×8 image block data is completed, the register REG6 locks the sum of absolute difference of the 8×8 image block data. The adder ADD1 accumulates the SAD6 to the register corresponding thereto by the switching of the selective circuit 440 before the ADD1 completely outputs the sum of absolute difference data of the 4×4 image block data. Compared with the circuit in FIG. 3, the circuit in this embodiment performs more efficiently though the selective circuit 440 and the adder 430 are added.

Although the present invention has been described in terms of exemplary embodiments, it is not limited thereto. Rather, the appended claims should be constructed broadly to include other variants and embodiments of the invention, which may be made by those skilled in the field of this art without departing from the scope and range of equivalents of the invention.

What is claimed is:

1. A circuit for computing sums of absolute difference, comprising:
an absolute difference circuit, for receiving a first data $PM_{i,j}$ and a second data $PS_{i,j}$, and outputting an absolute difference data $AD_{i,j}$, wherein $PM_{i,j}$, $PS_{i,j}$ and $AD_{i,j}$ represent a (i,j) data of the first data, the second data and the absolute difference data, respectively, and wherein $AD_{i,j}=|PM_{i,j}-PS_{i,j}|$, and i and j are integers not less than 0;
a first selective circuit, for selecting the absolute difference data, a second sum of absolute difference data or a zero data, and outputting the selected one of the absolute difference data, the second sum of absolute difference data and the zero data as a first accumulative data according to a first preset timing sequence, wherein a value of the zero data is 0;
a first adder, for receiving and adding the first accumulative data and a second accumulative data, and outputting a first sum;
a first register, for receiving and locking the first sum according to a second preset timing sequence, and outputting a first sum of absolute difference data;
a second selective circuit, for selecting the first sum of absolute difference data or the zero data, and outputting the selected one of the first sum of absolute difference data and the zero data as the second accumulative data; and
a second register, for receiving and locking the first sum according to a third preset timing sequence, and outputting the second sum of absolute difference data.

2. The circuit for computing sum of absolute difference of claim 1, wherein the absolute difference circuit comprises:
a subtracter, for receiving the first data and the second data, and subtracting the first data from the second data or subtracting the second data from the first data so as to generate a difference value;
a third register, coupled to the subtracter, for locking the difference value according to a fourth preset timing sequence;
a complement circuit, coupled to the third register, for generating a complement value of the difference value; and
a third selective circuit, coupled to the third register and the complement circuit, for receiving the difference value and the complement value of the difference value, and outputting the difference value or the complement value of the difference value which is a positive value as the absolute difference data.

3. The circuit for computing sums of absolute difference of claim 2, wherein the complement circuit comprises:
an inverter, for receiving and inverting the difference value, and outputting an inversion difference value; and
a second adder, coupled to the inverter, for receiving and adding the inversion difference value and an one data so as to output the complement value of the difference value, wherein a value of the one data is 1.

4. The circuit for computing sums of absolute difference of claim 1, wherein the first register does not comprise a reset function.

5. The circuit for computing sums of absolute difference of claim 1, further comprising:
a third adder, for receiving and accumulating the second sum of absolute difference data and a third accumulative data, and outputting a second sum;
a fourth register, for receiving and locking the second sum according to a fourth preset time sequence, and outputting the third sum of absolute difference data; and
a fourth selective circuit, for selecting the third sum of absolute difference data or the zero data, and outputting the selected one of the third sum of absolute difference data and the zero data as the third accumulative data.

6. The circuit for computing sums of absolute difference of claim 1, wherein the first data and the second data represent an image block data and a to-be-compared image block data, respectively.

* * * * *